United States Patent
Yan et al.

(10) Patent No.: US 9,926,200 B1
(45) Date of Patent: Mar. 27, 2018

(54) HIGHLY PURIFIED CARBON NANOTUBES AND METHOD OF THEIR PREPARATION

(71) Applicant: YAZAKI CORPORATION, Tokyo (JP)

(72) Inventors: Yongan Yan, Thousand Oaks, CA (US); Satyabrata Raychaudhuri, Thousand Oaks, CA (US)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/663,339

(22) Filed: Mar. 19, 2015

Related U.S. Application Data

(60) Provisional application No. 61/970,821, filed on Mar. 26, 2014.

(51) Int. Cl.
    *C01B 31/02*     (2006.01)

(52) U.S. Cl.
    CPC .................. *C01B 31/026* (2013.01)

(58) Field of Classification Search
    CPC ... C01B 31/0253; C01B 31/026; C01B 32/17; C01B 32/168
    See application file for complete search history.

(56) References Cited

U.S. PATENT DOCUMENTS

2009/0015984 A1* 1/2009 Grigorian .............. H01G 11/36
    361/305

FOREIGN PATENT DOCUMENTS

| JP | 2004266133 A | * | 9/2004 | |
|----|---|---|---|---|
| JP | 2004277279 A | * | 10/2004 | |
| WO | WO 2012177555 A2 | * | 12/2012 | ............. C01B 31/02 |

OTHER PUBLICATIONS

Jeong, Tak, Wan-Young Kim, and Yoon-Bong Hahn. "A new purification method of single-wall carbon nanotubes using H 2 S and O 2 mixture gas." Chemical physics letters 344.1 (2001): 18-22.*

Nagasawa, Shinichi, et al. "Effect of oxidation on single-wall carbon nanotubes." Chemical Physics Letters 328.4 (2000): 374-380.*

(Continued)

*Primary Examiner* — Richard M Rump
(74) *Attorney, Agent, or Firm* — Perkins Coie LLP; Viola T. Kung

(57) ABSTRACT

Highly purified carbon nanotubes (CNT) having virtually no carbonaceous impurities (amorphous carbon) nor inorganic impurities (metal and metal oxides), and methods of their preparation are described. The purified CNT feature excellent electrical, mechanical, and thermal properties due to the near total absence of detrimental impurities. The CNT starting material is preferably in the form of wafer, film, or buckypaper for efficient diffusion of purifying media. The highly pure CNT are prepared by heat treating a CNT starting material in a specified amount of oxygen, then treating the CNT in a solution comprising water and acid, or further heat treating the CNT in an atmosphere comprising chlorine ($Cl_2$). Extremely low levels of inorganic impurities may be achieved by treating sequentially with a treatment solution followed by chlorine. Removal of chloride from purified CNT may be achieved by further treating the chlorine-treated material in an atmosphere comprising hydrogen ($H_2$).

16 Claims, 10 Drawing Sheets

(56) References Cited

OTHER PUBLICATIONS

Machine English translation of JP2004266133A.*
English machine translation of JP2004277279A.*
Vigolo, Brigitte, et al. "A comprehensive scenario for commonly used purification procedures of arc-discharge as-produced single-walled carbon nanotubes." Carbon 48.4 (2010): 949-963.*

* cited by examiner

1

HIGHLY PURIFIED CARBON NANOTUBES AND METHOD OF THEIR PREPARATION

This application claims the benefit of U.S. Provisional Application No. 61/970,821, filed Mar. 26, 2014; which is incorporated herein by reference in its entirety.

TECHNICAL FIELD

This invention relates generally to carbon nanotube materials having extremely high purity with regard to amorphous carbon and inorganic impurities, i.e. metals and metal oxides. This invention also relates to methods of preparing extremely pure carbon nanotubes without excessive loss of nanotube material, and without measurable damage to the material. The highly purified carbon nanotubes are useful in various electronics applications requiring high conductivity and durability.

BACKGROUND

Carbon nanotubes (CNT) are of substantial interest for numerous potential applications due to their unique electrical, thermal, and mechanical properties. For example, certain nanotubes are believed to have strength on the order of 100 s of GPa, or more than 100 times stronger than steel. They also have unique electrical properties that make them attractive for use in solar cells, capacitors, batteries and other energy storage devices, as conductive coatings, in gas sensors, etc.

Impurities in CNT materials appear in multiple forms and are often introduced during the synthesis of CNT. In a typical manufacturing process called alcohol catalytic chemical vapor deposition (ACCVD), evaporated methanol or ethanol vapors come in contact with catalyst particles such as nickel or iron, embedded on magnesium oxide or silica as catalyst support, at high temperatures inside a furnace. At such conditions, ethanol or methanol molecules break down, and CNT start growing around the catalyst. However, this process also results in the generation of amorphous carbon, which can be located randomly on the outer surfaces of CNT. Amorphous carbon is the most common impurity and the hardest to remove, due to bonding on certain carbon atoms. Other types of impurities include catalyst residue such as iron (Fe), nickel (Ni), cobalt (Co), molybdenum (Mo), etc., and catalyst support materials such as magnesium oxide (MgO), aluminum oxide ($Al_2O_3$), and silicon dioxide (silica, $SiO_2$).

Amorphous carbon and inorganic impurities in CNT materials are detrimental to the electrical, thermal, and mechanical properties of the material. The presence of impurities can affect the properties to an extent that renders the CNT material unsuitable for many applications. For this reason, significant effort has been undertaken to produce purified CNT.

A common method of evaluating CNT for the presence of amorphous carbon is by visual observation at high magnification (greater than about 20,000×). This can be accomplished using commercially available instruments such as a scanning electron microscope (SEM) or transmission electron microscope (TEM). The visual appearance of amorphous carbon under high magnification is quite distinct from that of CNT and CNT bundles, and good qualitative evaluations of amorphous carbon content in a CNT sample can be achieved by this method.

Evaluation of inorganic impurity contact in a CNT material can be accomplished by a variety of means to different levels of accuracy and precision. Common methods include Energy Dispersive X-Ray Spectroscopy, which is usually conducted in concert with SEM or TEM, and Inductively Coupled Plasma Mass Spectrometry (ICP-MS). The former is a semi-quantitative method that is most useful for identifying, rather than quantifying, the impurity elements present in a CNT sample. The latter can be used to determine precise amounts of those elements in the material.

Another technique useful for evaluating the quality of CNT, i.e., the concentration of structural defects and amorphous carbon impurities included therein, is by measuring the intensity ratio of two characteristic Raman spectral peaks, called the G/D ratio. The G-band is a tangential shear mode of carbon atoms that corresponds to the stretching mode in the graphite plane. The D-band is a longitudinal optical (LO) phonon and is known as the disordered or defect mode, as it is a typical sign for defective graphitic structures in CNT. The comparison of the ratios of these two peaks' intensities gives a measure of the quality of the CNT samples. Generally, the G/D ratio is used to quantify the structural quality of carbon nanotubes. Thus, CNT having a higher G/D indicate a lower amount of defects and a higher level of quality.

A G/D ratio is typically determined using a Raman spectroscopy technique. Any of various commercially available instruments may be used to measure the G and D band intensities and to calculate the G/D ratio. One example of such equipment is available from HORIBA Jobin Yvon Inc., Edison, N.J., under the model name LabRAM ARAMIS.

The G/D ratio usually changes after a purification is applied to a sample of CNT. When purified of amorphous carbon, the G/D ratio of the purified CNT is typically greater than the G/D ratio of the starting CNT, indicating that the purified CNT has fewer structural defects and/or carbonaceous impurities with different carbon bond types than that of CNT. For removal of inorganic impurities, prior art methods, such as reacting in highly concentrated acids at elevated temperatures, typically result in significant decrease in G/D ratio, indicating that the purification process imparted damage to the CNT structure.

Various methods of removing amorphous carbon and inorganic impurities are known in the literature, including thermal oxidation, various solution treatments, and various gas treatments. However, existing methods tend to damage CNT (as mentioned above), cause significant loss of CNT, or result in only partial purification. Known commercial methods typically entail treatment of CNT with concentrated acid, such as nitric acid, often at elevated temperatures, followed by a slow heat treatment. Although this protocol has been proven to reduce both amorphous carbon and inorganic content, it is unsafe, and a substantial amount of contamination can still remain on the surface. Furthermore, treatment with concentrated acids is somewhat counterproductive, as it also introduces structural defects while removing superficial ones.

Therefore, there exists a need for an efficient and safe process for preparing purified CNT; the method should efficiently remove all or nearly all amorphous carbon and inorganic impurities without damaging or destroying the CNT.

SUMMARY OF THE INVENTION

The present invention is directed to a carbon nanotube (CNT) material having extremely high purity with regard to both carbonaceous impurities (amorphous carbon), and inorganic impurities (metal and metal oxides), as well as high Raman G/D ratio.

The present invention is also directed to a method for preparing a CNT material having extremely high purity with regard to both carbonaceous impurities (amorphous carbon), and inorganic impurities (metal and metal oxides).

In a first embodiment, the method comprises the steps of (a) obtaining a CNT starting material that contains impurities, (b) selectively removing amorphous carbon from the CNT starting material by heat treating in the presence of a specified amount of oxygen, and (c) selectively removing inorganic impurities from the CNT material by treating it with a treatment solution comprising water and acid.

In a second embodiment, the method comprises the steps of (a) obtaining a CNT starting material that contains impurities, (b) selectively removing amorphous carbon from the CNT starting material by heat treating in the presence of a specified amount of oxygen, and (c) selectively removing inorganic impurities from the CNT material by treating it in an atmosphere comprising chlorine.

In a third embodiment, the method comprises the steps of (a) obtaining a CNT starting material that contains impurities, (b) selectively removing amorphous carbon from the CNT starting material by heat treating in the presence of a specified amount of oxygen, (c) selectively removing inorganic impurities from the CNT material by treating it with a treatment solution comprising water and acid, and (d) further selectively removing inorganic impurities from the CNT material by treating it in an atmosphere comprising chlorine.

In a preferred embodiment, the CNT starting material is in the form of wafer, film, or buckypaper. In another preferred embodiment, the treatment solution comprises organic solvent in addition to water and acid. In a further preferred embodiment, CNT material that has been purified of inorganic impurities by treating in chlorine, is further treated in an atmosphere comprising hydrogen to remove residual chloride.

DETAILED DESCRIPTION

A novel method is herein described for preparing purified carbon nanotubes, or CNT. The method allows the removal of all (or nearly all) amorphous carbon, as well as nearly all inorganic impurities (metals and their oxides), without degrading or damaging the CNT. The method results in CNT having extremely high purity, and Raman G/D ratio greater than that of the starting material.

Figure 1:
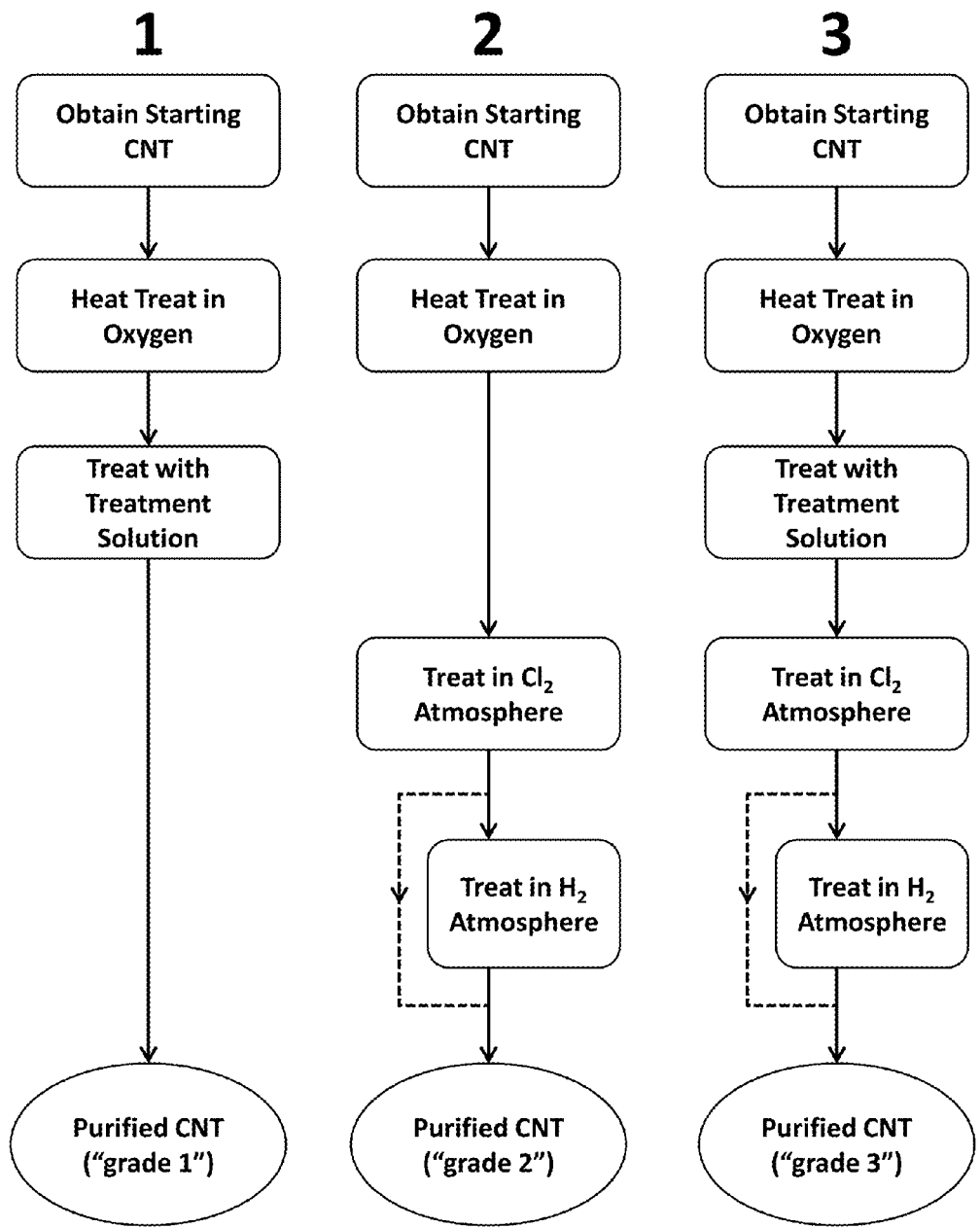
FIG. 1 shows a flow diagram illustrating the CNT purification method of the present invention.

In a first embodiment, the method comprises the steps of: (a) obtaining a carbon nanotube (CNT) starting material that contains impurities; (b) selectively removing amorphous carbon from the CNT starting material by heat treating it in the presence of a specified amount of oxygen; and (c) selectively removing inorganic impurities from the material by treating it with a treatment solution comprising water and acid. This embodiment is illustrated by flow diagram (1), in FIG. 1. The purified CNT obtained by this embodiment of the invented method is designated "grade 1".

In a second embodiment, the method comprises the steps of (a) obtaining a CNT starting material that contains impurities, (b) selectively removing amorphous carbon from the CNT starting material by heat treating in the presence of a specified amount of oxygen, and (c) selectively removing inorganic impurities from the CNT starting material by treating it in an atmosphere comprising chlorine. This second embodiment is illustrated by flow diagram (2), in FIG. 1. The purified CNT material obtained by this embodiment of the invented method is designated "grade 2".

In a third embodiment, the method comprises the steps of (a) obtaining a CNT starting material that contains impurities, (b) selectively removing amorphous carbon from the CNT starting material by heat treating in the presence of a specified amount of oxygen, (c) selectively removing inorganic impurities from the CNT material by treating it with a treatment solution comprising water and acid, and (d) further selectively removing inorganic impurities from the CNT material by treating it in an atmosphere comprising chlorine. This third embodiment is illustrated by flow diagram (3), in FIG. 1. The purified CNT material obtained by this embodiment of the invented method is designated "grade 3".

In all embodiments of the invention described herein, the sequence of steps is important to achieving the maximum benefit in terms of impurities removed from the CNT starting material. In particular, it is important that the heat treatment in the presence of oxygen, to remove carbonaceous impurities, is performed prior to any of the described treatments used to remove inorganic impurities. The main reason for this is that carbonaceous impurities such as amorphous carbon tend to form in the areas immediately adjacent to inorganic impurities in the CNT, such as catalyst and catalyst support residue materials. These inorganic impurities can be shielded, surrounded, or encapsulated by the carbonaceous impurities, thereby preventing their removal by the described techniques such as solution treatment or exposure to chlorine gas. Once the carbonaceous impurities are removed, the residual catalyst material is exposed and readily removed by the subsequent step(s).

The first step of the invented method comprises obtaining a carbon nanotube (CNT) starting material that contains impurities. The CNT starting material may comprise single-wall carbon nanotubes (SWCNT), double-wall carbon nanotubes (DWCNT), multi-wall carbon nanotubes (MWCNT), or any combination thereof. In a preferred embodiment, the CNT starting material is selected from the group consisting of SWCNT, DWCNT, and the combination thereof.

The CNT starting material may be in the form of powder, particles, flakes, loose agglomerates, wafer, film, "buckypaper", any combination of the preceding forms, or any of those forms individually or in any combination, as an aqueous slurry or wet cake.

In a preferred embodiment, the CNT starting material is in the form of wafer, film, or buckypaper. Such structures may be prepared by any of a number of known techniques, such as those described in WIPO publication WO 2010/102250 A2, WIPO publication WO 2012/177555 A2, or US patent application publication US 2013/0040229 A1, all incorporated herein by reference in their entirety. Preferably, the thickness of the film, buckypaper, or wafer is less than about 500 µm, more preferably less than about 100 µm, and still more preferably less than about 50 µm.

The preferred embodiment of the starting material is a wafer, film, or buckypaper, because this configuration allows the most efficient and complete purification to take place via the invented method. CNT materials, especially those typically provided by commercial suppliers, are often in the form of powders or granules having diameter or largest dimension in the range of hundreds of micrometers to several millimeters. These shapes and sizes effectively isolate the material in the cores of the powder particles or granules, preventing the penetration of purifying substances including gases and liquids. This results in only partial purification when the CNT starting material is exposed to the purifying treatments. In contrast, wafer, film, or buckypaper allow diffusion of gases and liquids through their thicknesses, resulting in exposure of all material to the purifying effects of those media.

The impurities present in the CNT starting material may comprise carbonaceous impurities including amorphous carbon, inorganic impurities such as metals and their oxides, or both types of impurities. The method of the invention is not limited as to the amount of impurities present in the starting material, although it is especially useful in purifying CNT that contains both types of impurities, in amounts typically found in commercially available CNT.

In particular, the total amount of all types of impurities in a CNT starting material is preferably less than 99%. The total amount of inorganic impurities as metal and/or metal oxides is preferably less than 90%, more preferably less than 50%, and still more preferably less than 20%, in order to achieve the best possible results via the method of the present invention.

CNT starting materials may be obtained from commercial sources. Examples include SWCNT and MWCNT materials sold under the trade name "Elicarb®", available from Thomas Swan & Company (Consett, County Durham, United Kingdom), SWCNT and MWCNT available from Southwest Nanotechnologies Inc. (Norman, Oklahoma), SWNT materials available from Carbon Solutions, Inc. (Riverside, Calif.), or any of various SWCNT, DWCNT, and MWCNT materials sold under the trade name Nanocyl™, by Nanocyl S.A. (Auvelais, Belgium).

In the second step of the invented method, amorphous carbon is selectively removed from the CNT starting material by heat treating it in the presence of a specified amount of oxygen. This step may be conducted using any temperature-controlled chamber capable of heating above 200° C., having an internal space sufficient to hold the CNT material. Preferably, this step is conducted using an oven or furnace capable of providing a controlled atmosphere with a gas supply, that can be sealed to isolate the internal space from the outside environment. A vacuum furnace, graphite furnace, or quartz tube furnace are examples of appropriate heating chambers with which to conduct this step of the method. Preferably, the heating chamber is connected to gas supplies including oxygen and an inert gas such as helium, nitrogen, or argon.

The heating and cooling rates used in this step are not particularly limited, although the heating rate should be sufficiently slow such that the maximum desired temperature is not exceeded by "overshooting" the temperature set point. Cooling may be accomplished as quickly as the heating chamber will allow, although preferably no quenching (gas or liquid) should be used to increase cooling rate.

Prior to heating the CNT starting material, it is loaded into the heating chamber, the chamber is sealed, and the chamber is then purged with inert gas to effectively remove any air or moisture. The inert gas may be any chemically non-reactive gas such as a noble gas or other non-oxidizing gas, or a mixture of such gases. Nitrogen ($N_2$), helium (He), and argon (Ar) are examples of appropriate gases. Preferably, an ultra-high purity grade of inert gas is used, such as are commercially available, or measures are taken to ensure the supply of inert gas has been purified prior to entering the chamber.

The main parameters used to control the removal of amorphous carbon from the CNT starting material in this step are (i) the temperature at which the material is heated; (ii) the duration of heating at that temperature; and (iii) the amount or concentration of oxygen supplied during the heating at that temperature.

After placing it into the heating chamber and sealing the chamber, the CNT starting material is heated to a specified temperature between 200° C. and 1100° C., or between 300° C. and 800° C., or between 300° C. and 700° C., or between 300° C. and 400° C., or between 400° C. and 500° C., or between 500° C. and 600° C., or between 600° C. and 700° C., or between 350° C. and 450° C., or between 450° C. and 550° C., or between 550° C. and 650° C. The ideal temperature range is that which allows complete or near complete removal of amorphous carbon while minimizing combustion and collateral loss of CNT. This range may vary depending on the type or source of CNT, initial amount of amorphous carbon present, and the form of the CNT to be treated (i.e. powder, wafer, etc.)

The duration of heating at the specified temperature is typically between 0.2 and 200 hr, preferably between 2 and 100 hr, and more preferably between 20 and 80 hr. It is especially preferable for the duration of heating to be between 30 and 60 hr, as this provides the best balance between precise process control (to maximize purification and minimize CNT loss), and the economic demands for expeditious material processing.

During the heat treatment, the atmosphere inside the heating chamber comprises oxygen and inert gas. Preferably, contaminants such as water vapor or other potentially reactive species are not present in the atmosphere or are at least limited to trace levels (less than 1 ppm). The atmosphere may be static or continuously flow through the chamber. The latter case is preferable as this promotes removal of reaction products from the chamber and exposure of the CNT material to fresh oxygen.

In general, the amount of oxygen provided during the heat treatment has an effect on the amount of amorphous carbon removed, as well as the amount of CNT that is lost collaterally due to combustion. The amount of oxygen provided during the heat treatment is defined as the amount of oxygen supplied to the heating chamber while the heating chamber is at the specified temperature.

The amount of oxygen provided during the heat treatment may be specified as a percentage or ratio by moles or volume of the gas inside the chamber, or of the supplied gas stream, for example in terms of parts per million. In general, the oxygen content is typically between 1 ppm and 200,000 ppm (20%), or between 1000 ppm and 100,000 ppm (10%), or between 2000 ppm and 20,000 ppm (2%). Or, the oxygen content is between 500 ppm and 50,000 ppm, or between 1000 ppm and 10,000 ppm. Or, the oxygen content is between 100 ppm and 10,000 ppm, or between 500 ppm and 5000 ppm. Or, the oxygen content is between 2000 ppm and 200,000 ppm, or between 4000 ppm and 40,000 ppm.

The oxygen provided to the chamber may be controlled by any appropriate available means, such as mass flow controllers or rotameters. Further, the oxygen content of the gas exiting the chamber may be continuously monitored using a commercially available oxygen monitoring device, for example, Series 3000 instrument sold by Alpha Omega Instruments, Lincoln, R.I.

Alternatively, and preferably, the amount of oxygen provided during the heat treatment step is specified in terms of the ratio of total amount of oxygen supplied to the total quantity of carbon removed. The total carbon removed includes both amorphous carbon and CNT. That is, total carbon removed is the difference between the total amount of carbon present in the CNT starting material, including CNT and carbonaceous impurities, and the total amount of carbon present in the material after the heat treatment, again including CNT and any remaining carbonaceous impurities. For any CNT starting material comprising amorphous carbon, there exists an optimum range of this ratio, within which the amount of amorphous carbon removed is maximized while the amount of CNT lost due to combustion is minimized. This ratio of oxygen supplied to total carbon removed ($O_2:C_{Rem}$) in terms of moles is typically between 1 and 100, preferably between 1 and 10, more preferably between 1 and 8, and still more preferably between 1 and 5.

In order to determine the amount of oxygen to provide that will result in an $O_2:C_{Rem}$ ratio within the preferred range, it may be necessary to conduct a series of trial-and-error heat treatments with a particular CNT starting material (for example, a particular grade or catalog number of material from a particular supplier, for example, SWCNT sold under the name Elicarb® SW by Thomas Swan & Co., Ltd.). The series of trial-and-error heat treatments represent an iterative process, wherein the initial parameters such as heat treatment temperature and oxygen concentration in the gas stream are selected based on past experience with other CNT types.

In this iterative process, a first trial heat treatment with the particular CNT starting material is conducted under the selected conditions. During the trial heat treatment, the oxygen content of the gas exiting the chamber is monitored. The exiting oxygen content will decrease from an initial value when the oxidation of amorphous carbon commences. For example, the $O_2$ concentration in the exit gas may initially be about 10,000 ppm, and then drop to about 4000 ppm when oxidation commences at the selected temperature. After some time, the oxygen concentration in the exit gas will start to increase, and will eventually return to approximately its initial level. This indicates that oxidation of carbon has ceased or at least substantially declined, and the trial heat treatment is then concluded by cooling the chamber and discontinuing the flow of oxygen.

The amount of oxygen supplied during the heat treatment is calculated from the concentration, flow rate, and time of heat treatment, and the amount of carbon removed is calculated by subtracting the weight of the heat treated CNT material from the initial weight of the CNT starting material. The amounts of oxygen supplied and carbon removed are converted to moles and the molar ratio of $O_2:C_{Rem}$ is then determined. If this ratio falls within the preferred range, then the parameters of the heat treatment are optimized for the particular CNT starting material. If the ratio is outside the preferred range, a second iterative heat treatment may be conducted with the same CNT starting material, with one or more process parameters varied in order to bring the $O_2:C_{Rem}$ ratio within the preferred range.

A ratio of $O_2:C_{Rem}$ above the preferred range may indicate that amorphous carbon removal was completed, but the heat treatment was longer than necessary, resulting in excess oxygen being supplied to the chamber. The extent of amorphous carbon removal may be cross-checked by examination of the heat treated material under high magnification, such as by electron microscopy. Measurement of Raman G/D ratio may also be helpful in determining the extent of amorphous carbon removal. If removal of amorphous carbon was complete, as evidenced by its visible absence and/or an attendant increase in G/D ratio to a value greater than about 10, the amount of oxygen supplied or the duration of heat treatment may be reduced, both of which will lower the $O_2:C_{Rem}$ ratio. If amorphous carbon is still present in the material, as evidenced by its visible presence or a G/D ratio close to that of the starting material, or lower than about 10, the heat treatment temperature may be increased, in order to increase $C_{Rem}$ and thereby lower the $O_2:C_{Rem}$ ratio.

A ratio of $O_2:C_{Rem}$ below the preferred range may indicate that amorphous carbon removal was incomplete in the heat treatment process. Again, this may be cross-checked by electron microscopy and Raman measurements. If amorphous carbon is still present, $O_2$ concentration, duration of heat treatment, and/or heat treatment temperature may be increased, in order to increase the $O_2:C_{Rem}$ ratio.

After ascertaining the $O_2:C_{Rem}$ ratio, and determining the extent of amorphous carbon removal, a second trial heat treatment is conducted under process parameters modified as described above, and the $O_2:C_{Rem}$ ratio for the second trial is determined. This iterative process is continued until the experimental parameters are determined that will result in a ratio of $O_2:C_{Rem}$ within the preferred range, along with complete removal of amorphous carbon as evidenced by visual observation and Raman G/D ratio measurements.

In the third step of the invented method, inorganic impurities are selectively removed from the CNT material by treating it with a treatment solution comprising water and acid. The type of acid used in the treatment solution is not particularly limited, and may be any organic or inorganic acid. One or more than one type of acid may be used. Inorganic acid is preferable because it is typically more reactive with the inorganic impurities (metals and their oxides) present in CNT and will not leave organic residues in the CNT after the treatment. Commonly available acids such as HCl, $HNO_3$, and $H_2SO_4$ are preferred.

In a preferred embodiment, the acid is HCl, which is commonly available as a concentrated aqueous solution containing about 37% by weight HCl, or about 12N (for example, product number 258148, Sigma-Aldrich Corporation, St. Louis, Mo.). The molar concentration of acid in the treatment solution is typically between 0.01N and 20N, preferably between 0.1N and 10N, more preferably between 1N and 8N, and still more preferably between 1N and 5N.

In another preferred embodiment, the treatment solution comprises hydrofluoric acid (HF), in addition to one or more other acids. HF is commonly available as a concentrated aqueous solution containing about 49% by weight HF, or about 29N (for example, product number 339261, Sigma-Aldrich Corporation). The molar concentration of HF in the treatment solution is typically between 0.01N and 20N, preferably between 0.05N and 5N, more preferably between 0.1N and 1N, and still more preferably between 0.1N and 0.5N.

In an especially preferred embodiment, the treatment solution comprises HCl at a concentration of between 1N and 5N, and HF at a concentration of between 0.1N and 0.5N. A treatment solution thusly prepared is particularly suitable for removing inorganic impurities typically found in CNT, which typically comprise catalyst residues such as Fe, Ni, Co, Mo, etc., and catalyst support residues such as $SiO_2$, $Al_2O_3$, etc. The HCl present in the treatment solution effectively removes most metallic and some metal oxide residues, while the HF present in the treatment solution effectively removes $SiO_2$ and assists in removing metallic residues.

It is important to note that if the inorganic residue in the CNT material includes Mg, MgO, or other element(s) for which an insoluble fluoride compound exists, HF should not be used in the treatment solution unless the CNT material has already been treated to remove those elements. Otherwise, reaction with HF will produce the fluoride compound(s), which are generally insoluble in water and difficult to remove from CNT by washing. In such instances, the CNT material may be sequentially treated with one treatment solution capable of removing the fluoride-producing element(s), such as 1N-8N HCl, then treated with another treatment solution, such as 0.1N-0.5N HF.

In yet another preferred embodiment, the treatment solution comprises organic solvent in addition to water and acid. The presence of organic solvent in the treatment solution can substantially enhance the effectiveness of the solution in removing inorganic impurities. Certain CNT starting materials can be highly hydrophobic and will not wet when brought in contact with an aqueous solution. In particular, CNT wafer, film, and buckypaper may be hydrophobic due to the effects of processes applied to assemble the material into these forms. Similarly, certain types of CNT in their as-synthesized form, or in the condition as-received from a commercial supplier, may have certain types of functional groups or chemical additives present that render the material hydrophobic. Therefore, having both water and organic solvent in the treatment solution can significantly improve wetting of the CNT material to be purified.

The type of organic solvent used in the treatment solution is not particularly limited, but miscibility with water and the selected acid is a necessity. One or more type(s) of organic solvent may be used, provided all are miscible with water. Lower order alcohols such as methanol, ethanol, and propanols are preferred, as they tend to be safer to handle and less expensive than other solvents. In a preferred embodiment, the organic solvent is reagent alcohol, which is typically commercially available as a mixture of primarily (>90%) ethanol with propanol and sometimes methanol as minor components (for example, catalog number A995, Thermo Fisher Scientific, Waltham, Mass.).

The weight ratio of water:organic solvent in the treatment solution is typically between 20:1 and 1:20, preferably between 4:1 and 1:4, and more preferably between 3:1 and 1:2.

To apply the treatment solution to the CNT material, typically the material is immersed in the solution in a container. The size and shape of the container are not particularly limited, provided that the CNT material and the treatment solution can both be accommodated, and the CNT material can be fully covered by the solution. The container should be made of a material that will not be attacked or otherwise damaged by the treatment solution. Immersion of the CNT material into the treatment solution may be accompanied by mechanical agitation, sonication, or a combination of these techniques, although this is optional.

The ratio of amount of treatment solution to amount of CNT material to be treated is typically between 0.1 and 100 liters solution/gram material (L/g), preferably between 0.3 and 10 L/g, and more preferably between 0.5 and 6 L/g. The time of immersion in the treatment solution is typically between 0.1 and 100 hr, preferably between 0.2 and 50 hr, and more preferably between 0.5 and 25 hr. Mild mechanical agitation, sonication, or a combination of the techniques may reduce the time needed to achieve maximum effect of the solution treatment, but again, is not required.

After the solution treatment, the CNT material is rinsed with a rinsing solution. The rinsing solution should not contain any components that can re-introduce impurities into the CNT material. The rinsing solution may consist essentially of water, or it may consist essentially of a solution of water and organic solvent. In the latter case, the ratio of water to organic solvent is typically 50/50 (w/w), but is not particularly limited. The type of organic solvent in the rinsing solution is also not particularly limited, but is preferably the same solvent that is used in the treatment solution, or a solvent that is miscible with the solvent used in the treatment solution. Rinsing is typically repeated once or twice, to ensure best possible removal of the treatment solution and dissolved impurities from the CNT material.

After rinsing the purified CNT material with the rinsing solution, the purified CNT may be dried by any practical means. Typically, the material is dried at or above room temperature for several hours. This may be accomplished under vacuum or at atmospheric pressure, and under an inert atmosphere or in air. In one embodiment, the material is dried in air at 200° C. for 3 hr in a standard convection oven.

After applying the heat treatment and solution treatment steps described above to the CNT starting material, the resulting CNT material is typically characterized by the total or near-total absence of amorphous carbon, and low levels of inorganic impurities. The total amount of inorganic impurities (metals and metal oxides) in a CNT material purified in this manner is typically less than about 1.0 wt %, usually less than about 0.5 wt %, and sometimes less than about 0.25 wt % (2500 ppm).

Qualitative determinations of amorphous carbon removal are possible by observing the starting material and purified material at high magnification under a scanning or transmission electron microscope (SEM or TEM). Typically, the percent reduction in amorphous carbon after applying the invented method to a CNT starting material is greater than 90%, greater than 99%, or greater than 99.9%. Typically, after applying the invented method to a CNT starting material, amorphous carbon cannot be observed in the purified CNT material at up to about 500,000× magnification.

The extent of amorphous carbon removal may also be qualitatively evaluated by measuring and comparing the Raman G/D ratios of the CNT starting material and the purified CNT material. Typically, G/D ratio increases substantially after applying the purification method, and in particular, after applying the heat treatment step. The increase in G/D ratio is typically by a factor of at least 2, usually by a factor of at least 3, and often by a factor of 4 or more.

The amount of inorganic impurities in the purified CNT material is determined using any of appropriate known methods of elemental analysis, such as x-ray fluorescence spectroscopy (XRF), inductively coupled plasma optical emission spectrometry (ICP-OES), or ICP mass spectrometry (ICP-MS). The primary inorganic impurity elements present in a CNT starting material can be determined using qualitative or semi-quantitative techniques such as energy dispersive x-ray spectroscopy (EDS), or XRF. Once these elements are identified, quantitative measurements on selected elements of interest can be conducted using the prior-mentioned techniques. After applying the invented purification method, the amount of a particular element present in the CNT material decreases typically to less than 50%, usually to less than 20%, and often to less than 5% of the original amount.

The purity of the CNT material with regard to inorganic content can also be determined by measuring the total carbon amount in the sample, or by thermogravimetric analysis. In the latter case, the sample is heated in the presence of oxygen above at least 600° C. for sufficient time that all combustible material is removed. The remaining weight of material is assumed to be metals and metal oxides, that is, the inorganic content of the sample. The total inorganic content in the purified CNT material is typically less than 1% and usually less than 0.5% by weight of the material.

In a second embodiment of the present invention, the method comprises the steps of (a) obtaining a carbon nanotube (CNT) starting material that contains impurities; (b) selectively removing amorphous carbon from the CNT starting material by heat treating it in the presence of a specified amount of oxygen, and (c) selectively removing inorganic impurities from the CNT material by treating it in an atmosphere comprising chlorine gas ($Cl_2$).

In this embodiment, step (a), obtaining a carbon nanotube (CNT) starting material that contains impurities, and step (b), selectively removing amorphous carbon from the CNT starting material by heat treating it in the presence of a specified amount of oxygen, are conducted in the manner previously described herein.

In this third step of this embodiment, inorganic impurities are selectively removed from the CNT material by treating it in an atmosphere comprising chlorine gas ($Cl_2$). The treatment in chlorine may be accomplished in any suitable heating chamber or furnace with a controlled atmosphere that can be well-isolated from the outside environment. For example, a commercially available laboratory or industrial-scale furnace with a quartz tube chamber and flanged or ground-glass end caps is appropriate. Such equipment may be purchased, for example, from Mellen Company, Concord, N.H., and from GM Associates Inc., Oakland, Calif.

In a typical chlorine ($Cl_2$) treatment, the CNT material is loaded into the furnace or heating chamber and the chamber is purged with an inert gas (e.g., nitrogen, argon, or helium) at a sufficient flow rate, and for a sufficient time to remove moisture and oxygen. Then, while continuing the flow of inert gas, the chamber temperature is increased at a specified rate from room temperature to an intermediate temperature (between about 200° C. and 500° C.). The chamber is held at that temperature for a sufficient time to allow any absorbed moisture to evolve from the CNT material and interior surfaces of the chamber, and be purged from the chamber.

The chamber temperature is then further increased, still under flow of inert gas, to the $Cl_2$ treatment temperature, which is typically between about 600° C. and 1200° C., preferably between 800° C. and 1100° C., and more preferably between 900° C. and 1100° C. When the chamber temperature reaches the treatment temperature, the gas supply is changed to a mixture of an inert gas and chlorine. The gas mixture is typically comprised of between 1% and 50% (v/v) $Cl_2$, preferably between 3% and 30% $Cl_2$, and more preferably between 5% and 15% $Cl_2$. The chamber is held at the treatment temperature for between 0.1 hr and 100 hr, preferably between 0.5 hr and 10 hr, more preferably between 1 hr and 5 hr. During the exposure of the CNT material to chlorine, the gas flow rate should be sufficient to provide at least 0.5 volume change per hour, preferably at least 1 volume change per hour.

After exposing the CNT material to chlorine as specified, the chamber is then purged again with inert gas sufficiently to remove any remaining chlorine. The chamber is then cooled to room temperature, and the CNT material is removed.

A CNT material purified via this particular embodiment, i.e. heat treated under oxygen, then heat treated under chlorine, is a highly pure material. A CNT material purified in this manner contains virtually no amorphous carbon, and total inorganic impurity content is typically lower than 0.5% (w/w), usually lower than 0.2%, and sometimes lower than 0.1% (1000 ppm), as determined by a quantitative analysis method such as ICP-MS.

In a third embodiment of the present invention, the method comprises the steps of (a) obtaining a carbon nanotube (CNT) starting material that contains impurities; (b) selectively removing amorphous carbon from the CNT starting material by heat treating it in the presence of a specified amount of oxygen; (c) selectively removing inorganic impurities from the material by treating it with a treatment solution comprising water and acid, and (d) further removing inorganic impurities from the material by treating it in an atmosphere comprising chlorine gas.

In this embodiment, an extreme high level of purity can be achieved in the CNT material through the additive effect of removing inorganic impurities through two sequential techniques, i.e. treating with a treatment solution, and then treating in an atmosphere comprising chlorine gas. A CNT material purified via this particular embodiment, i.e. heat treated under oxygen, then solution treated, and then heat treated under chlorine, is an extremely pure material. A CNT material purified in this manner contains virtually no amorphous carbon, and total inorganic impurity content is typically lower than 0.5% (w/w), usually lower than 0.1%, and often lower than 0.05% (500 ppm), as determined by a quantitative analysis method such as ICP-MS.

In a preferred embodiment, after treatment in an atmosphere comprising $Cl_2$ gas, the CNT material is further treated in an atmosphere comprising hydrogen ($H_2$). The purpose of this additional treatment is to remove chloride species that may remain among the CNT. The hydrogen gas reacts with chlorides present in the material to form HCl in gaseous form, which is then purged from the chamber and scrubbed with (for example) sodium hydroxide (NaOH) to form a neutral salt solution, such as $Na^+Cl^-$ (aq).

Typically, the hydrogen treatment is conducted immediately following the $Cl_2$ treatment, at the same or similar temperature as the $Cl_2$ treatment, without cooling the treatment chamber in between. However, it is not necessary for the $H_2$ treatment to immediately follow the $Cl_2$ treatment in this manner. The two treatments may be conducted subsequently or separately, and in the same or in different chambers.

In a typical hydrogen gas treatment, the chlorine-treated CNT material is heated in the heating chamber to between about 600° C. and 1200° C., preferably between 800° C. and 1100° C., and more preferably between 900° C. and 1100° C., while purging the chamber with an inert gas. If performing the $H_2$ treatment immediately subsequent to the $Cl_2$ treatment, the chamber is purged with inert gas at a rate and for a time sufficient to provide at least 0.5 volume change, preferably at least 1 volume change. The gas supply is then changed from inert gas to a mixture of hydrogen ($H_2$) and inert gas. The mixture is comprised of typically between 0.1% and 20% (v/v) $H_2$, preferably between 0.5% and 15% $H_2$, and more preferably between 1% and 10% $H_2$. Commercially available mixtures of 5% $H_2$ in argon or helium are appropriate. The chamber is further held at the treatment temperature under the flow of hydrogen mixture for between 0.1 hr and 100 hr, preferably between 0.5 hr and 10 hr, more preferably between 1 hr and 5 hr. During the treatment with hydrogen, the gas flow rate should again be sufficient to provide at least 0.5 volume change per hour, preferably at least 1 volume change per hour. After the hydrogen treatment, the gas supply is changed back to inert gas, the chamber is cooled to room temperature, and the CNT material is removed.

CNT materials purified via the method of the present invention feature significantly improved properties due to the removal of impurities that are detrimental to those properties. With the absence of such impurities, the intrinsically attractive properties of CNT such as high electrical and thermal conductivity, high mechanical strength, chemical stability, etc. may be utilized to substantially greater benefit in many applications, compared to the CNT starting materials.

Typically the purified CNT materials show no trace of amorphous carbon when observed via electron microscopy at up to 100,000× magnification. Also, CNT purified according to the invented method typically have Raman G/D ratio greater than 10, indicating that the invented method imparts no damage to the CNT and in fact, improves its quality with regard to the presence of bonding defects in the material.

Furthermore, CNT purified according to the invented method contains low quantities of inorganic materials, i.e. metals and metal oxides. Typically, the purified CNT contains less than about 0.5% total inorganic residue. When chlorine treated, the purified CNT typically contains less than about 0.2% total inorganic residue. When both solution treated and chlorine treated, the purified CNT typically contains less than about 0.05% total inorganic residue (i.e. <500 ppm).

In one embodiment, the present invention provides a purified single wall or double wall carbon nanotubes prepared by the method of the present invention. The purified carbon nanotubes have no detectable amorphous carbon when observed at 100,000× magnification via electron microscopy, have a total inorganic impurity content as metals and metal oxides of less than 500 ppm, and have a Raman G/D ratio of 10 or higher.

The invention is illustrated further by the following examples that are not to be construed as limiting the invention in scope to the specific procedures or products described therein.

Example 1—Preparation of a Treatment Solution "AAA-1"

First, 240 grams de-ionized water are combined in a flask with 160 grams reagent alcohol (Catalog number A995-4, Thermo Fisher Scientific, Waltham Mass.). Then, 100 grams of hydrochloric acid (HCl, 35-38%) (Catalog number A508-500, Thermo Fisher Scientific) are slowly added to the flask. The contents of the flask are mixed thoroughly to form a uniform solution. The concentration of HCl in this solution is about 1.9N. This solution is identified as "AAA-1".

Example 2—Preparation of a Treatment Solution "AAA-2"

First, 270 grams de-ionized water are combined in a flask with 180 grams reagent alcohol. Then, 300 grams of hydrochloric acid (HCl, 35-38%) are slowly added to the flask. Lastly, 7.5 grams of hydrofluoric acid (HF, 47-51%) (Catalog number A513-500, Thermo Fisher Scientific) are slowly added to the flask. The contents of the flask are mixed thoroughly to form a uniform solution. The concentrations of HCl and HF in this solution are about 4.0N and 0.25N, respectively. This solution is identified as "AAA-2".

Example 3—Preparation of Single Wall Carbon Nanotube (SWCNT) Wafers

Cohesive carbon nanotube assemblies ("wafers") are prepared according to a method described in detail in WIPO publication WO 2012/177555A2. Single wall carbon nanotube (SWCNT) powder is obtained from Thomas Swan and Co., Ltd (Consett, County Durham, United Kingdom), under the product name "Elicarb® SW". The as-received SWCNT powder is examined using a scanning electron microscope (SEM) (model JSM-7500F, JEOL Ltd, Tokyo) at up to 300,000× magnification. The material appears as randomly oriented tubes and bundles with considerable portion of non-tubular amorphous carbon, as seen in FIG. 2(a).

In a flask 2.5 grams of this SWCNT powder are combined with 1250 ml toluene (Catalog number T324-4, Thermo Fisher Scientific). A uniform dispersion of the SWCNT in the toluene is prepared through a combination of mechanical agitation and sonication. The uniform dispersion of SWCNT in toluene is then cast equally into 24 individual 9-cm diameter glass dishes, such that about 100 mg of SWCNT are contained in each dish. The toluene is removed by evaporation in a vacuum oven, resulting in the formation of 24 cohesive SWCNT assemblies. Each of the assemblies is about 35 μm thick and about 9 cm in diameter. The assemblies are free-standing and are easily removed from the glass dishes. Four additional batches of 24 SWCNT wafers each are prepared in the exact same manner, to produce a total of 120 wafers.

Figure 2:
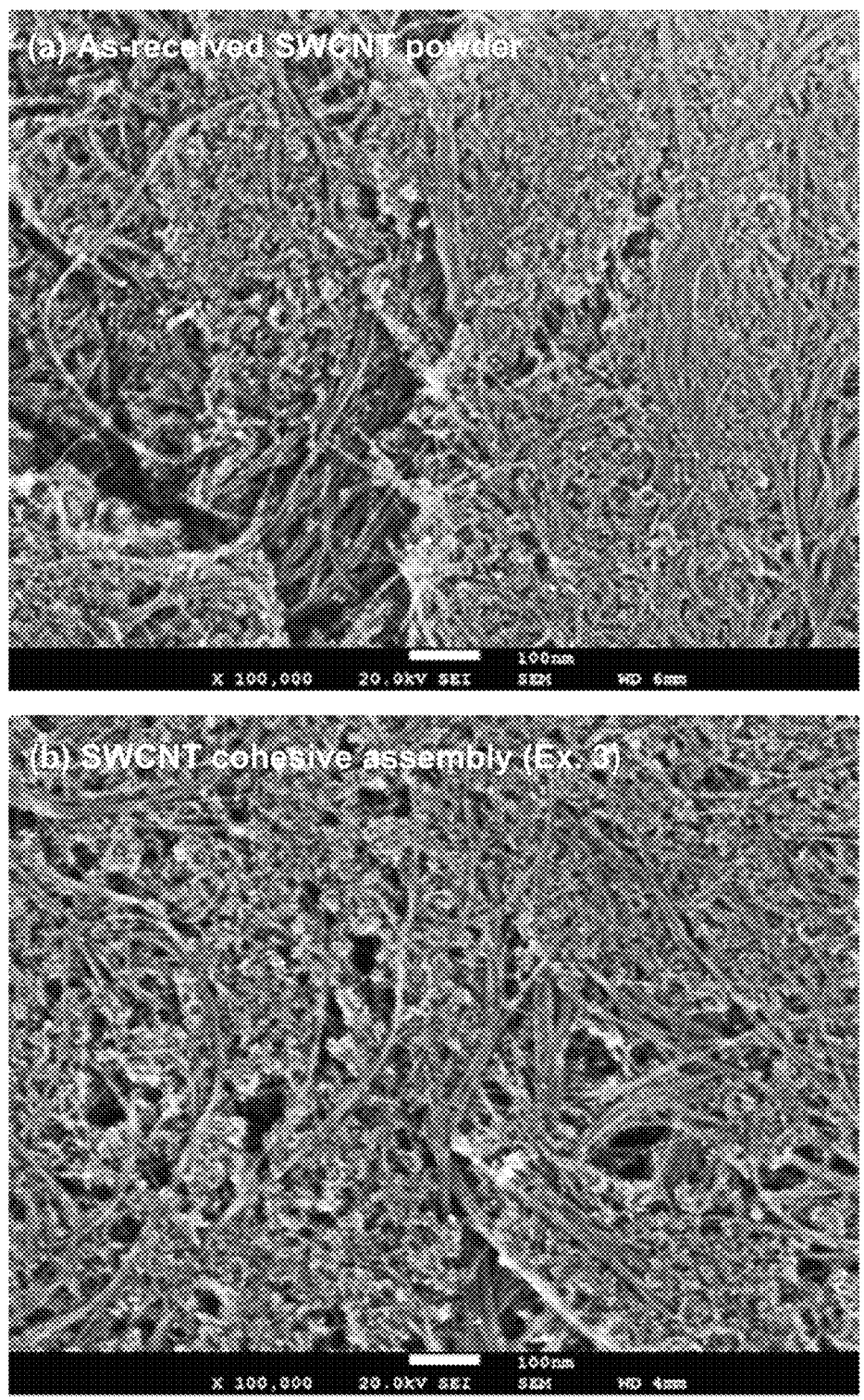
FIG. 2 shows scanning electron microscope (SEM) images of SWCNT powder as-received from a commercial supplier, and the same material after being formed into a wafer, as described in Ex. 3.

A cohesive SWCNT assembly prepared as described above is examined by SEM and, as for the as-received material, appears as randomly oriented tubes and bundles surrounded by amorphous carbon, as seen in FIG. 2(b).

Example 4—Purification of SWCNT Wafers by Heat Treatment 120 cohesive SWCNT assemblies prepared as described in Ex. 3 are loaded into a quartz tube furnace (Model SS15-15x48M-3Z, Mellen Company, Concord, N.H.), by placing them on perforated quartz plates arranged in two horizontal levels (upper and lower) inside the furnace tube. Seventy-two wafers are placed on the upper-level plates, and 48 wafers are placed on the lower-level plates. Prior to loading the wafers into the furnace, the weight of each wafer is measured and recorded.

The furnace is sealed and then purged for 4 hours with nitrogen flowing at 1.7 liter/min. The furnace gas supply is then changed to argon with 1 wt % (10,000 ppm) oxygen ($O_2$), flowing at 1.5 liter/min. The furnace is purged for a further 6 hrs under Ar/1% $O_2$.

While continuing the flow of Ar/1% $O_2$, the furnace is heated from room temperature (25° C.) to 500° C. at a rate of 250° C./hr, then held at 500° C. for 48 hrs. During this period, the oxygen concentration in the gas exiting from the furnace is measured using an oxygen monitor (Series 3000, Alpha Omega Instruments, Lincoln, R.I.), and recorded at regular intervals. After 48 hrs, furnace heating is discontinued and the furnace is allowed to cool naturally. The flow of Ar/1% $O_2$ is discontinued when the furnace temperature decreases below 300° C., and the heat treated SWCNT wafers are removed from the furnace when the temperature decreases below 50° C. The weight of each wafer is again measured and recorded.

Figure 3:
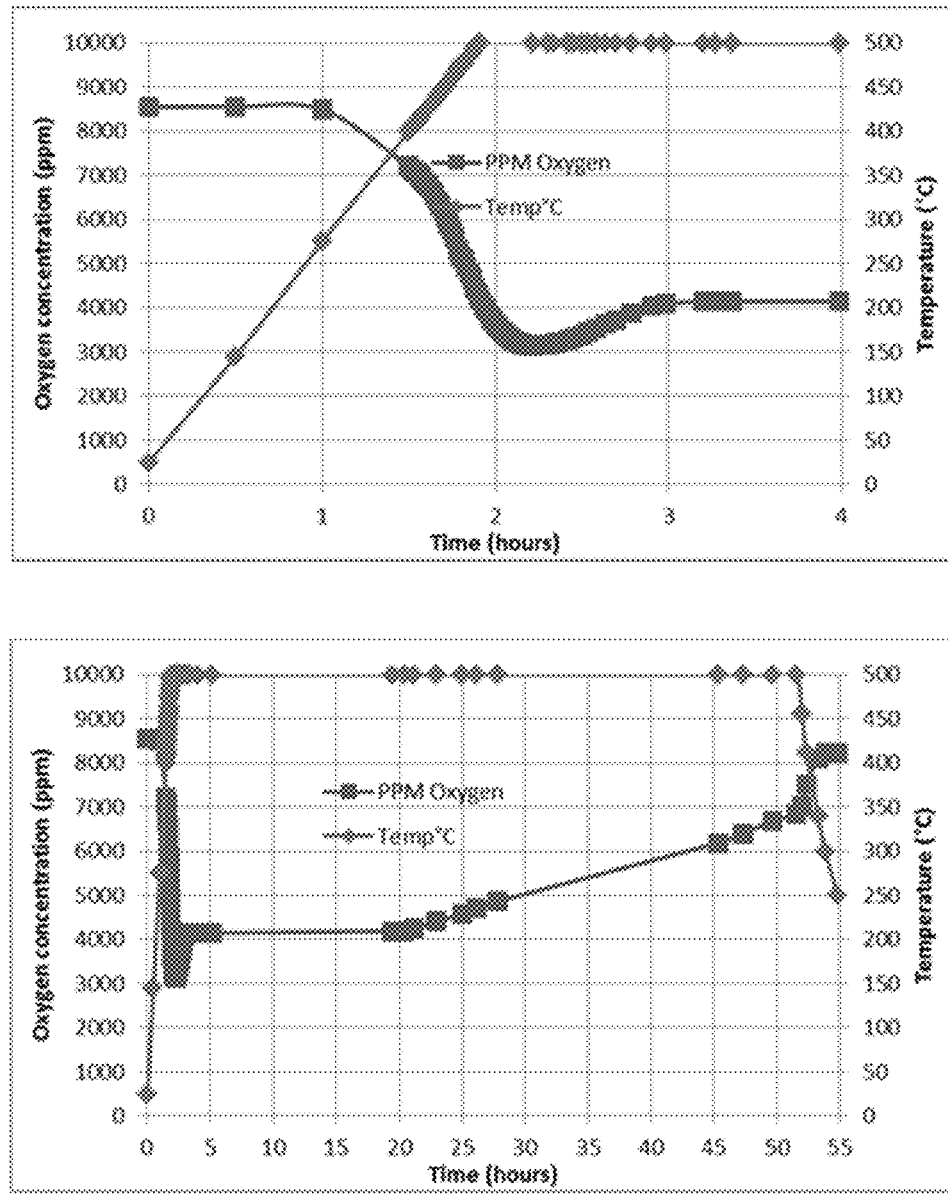
FIG. 3 shows charts of temperature and oxygen content in a controlled-atmosphere tube furnace vs. time, during a heat treatment to remove amorphous carbon from a CNT material, as described in Ex. 4.

As seen in FIG. 3, the oxygen amount exiting the furnace is initially stable at about 8500 ppm until the furnace temperature reaches about 300° C. (~1 hr), at which point it decreases rapidly to a minimum amount of about 3000 ppm soon after the temperature reaches 500° C. This indicates that the oxidation of amorphous carbon begins at about 300° C., and progresses more rapidly as the temperature increases to 500° C. After about 1 hour at 500° C., the oxygen content increases somewhat to about 4000 ppm, and remains there for about 17 hrs. After that, the oxygen content begins to rise steadily, indicating that the oxidation of amorphous carbon is slowing down, and nearing completion. Once furnace heating is discontinued, the oxygen content in the exiting gas returns to its original level, ~8500 ppm.

The total weight of all 120 SWCNT wafers prior to the heat treatment is 12,301 mg. The total weight of all 120 wafers after heat treatment is 3,109 mg. Therefore, the overall yield of SWCNT material for this heat treating process is about 25.4%. The average weight of each wafer after heat treatment is about 21 mg.

Based on the flow rate of the gas stream, the concentration of oxygen (10,000 ppm by weight), and the duration of the experiment, the total quantity of oxygen supplied during this heat treatment process is 1981 mmoles. The total amount of carbon removed from the 120 SWCNT wafers is 9,192 mg or 766 mmoles. Therefore, the molar ratio of oxygen supplied to carbon removed is about 2.59.

Figure 4:
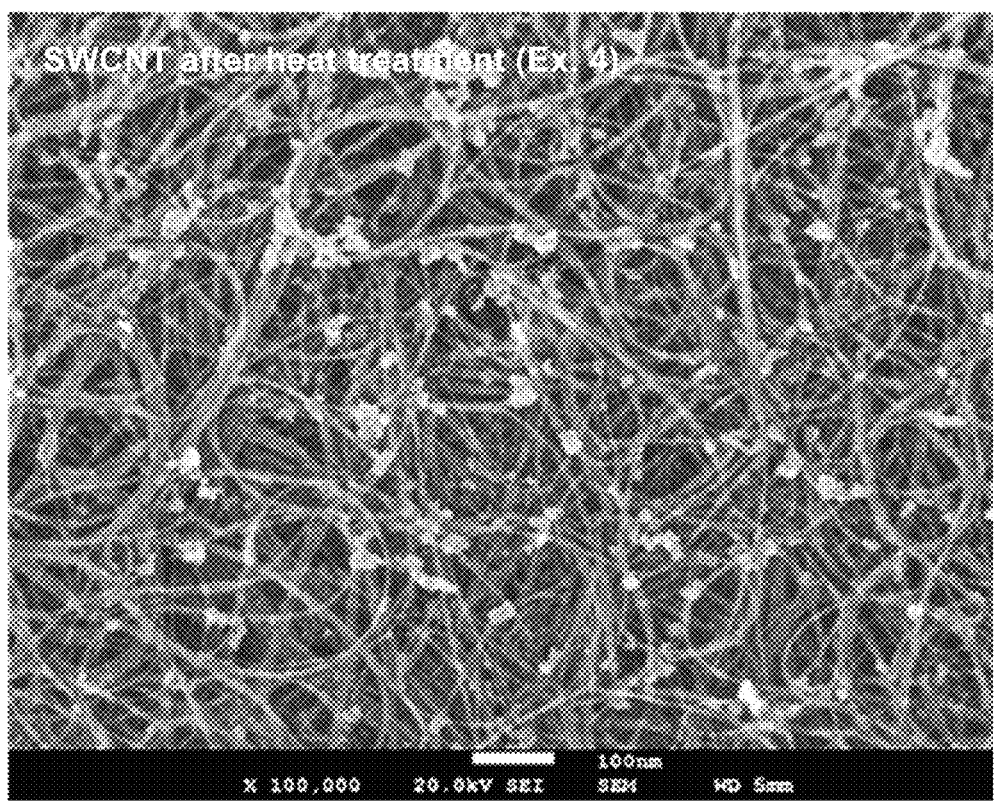
FIG. 4 shows a SEM image of a CNT starting material after heat treatment to remove amorphous carbon, as described in Ex. 4.

A SWCNT wafer is examined after the heat treatment by SEM. As seen in FIG. 4, the material consists almost entirely of carbon nanotubes and bundles of nanotubes. The amorphous material observed before the heat treatment, in both the as-received powder and the wafer, is not observable by SEM after the treatment. A large number of small white particles or clusters appear among the nanotubes and bundles. These are presumed to be inorganic impurity residue such as catalyst or catalyst support material.

Figure 5:
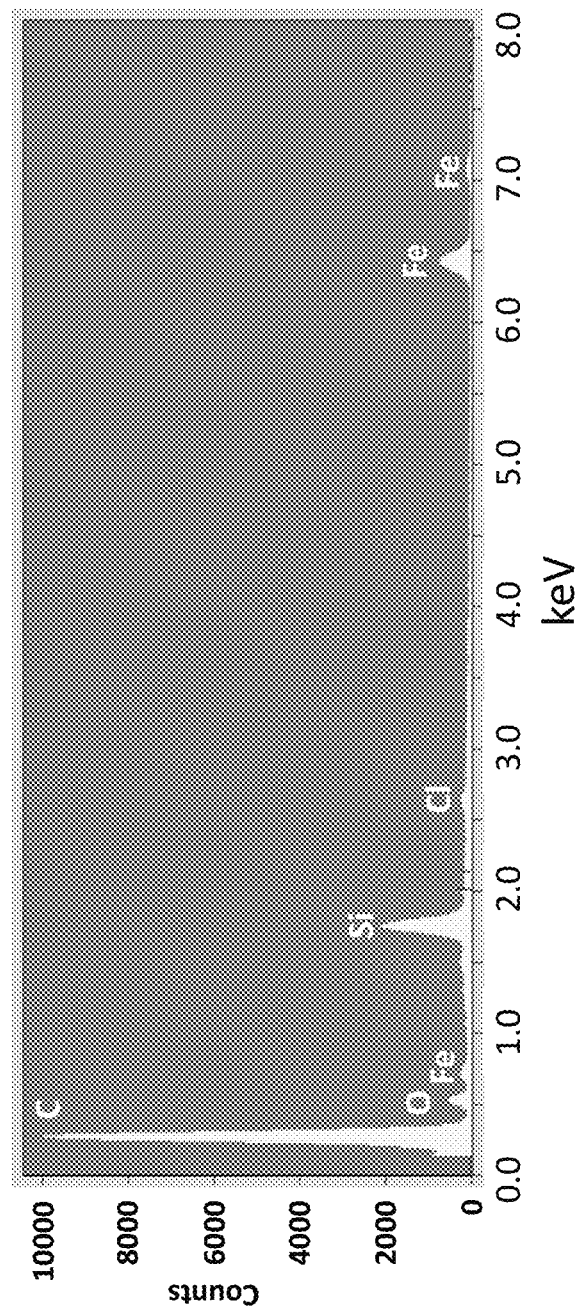
FIG. 5 shows the results of energy dispersive x-ray spectroscopy (EDS) analysis of a CNT material after heat treatment to remove amorphous carbon, as described in Ex. 4. Iron (Fe) and silicon (Si) are the primary impurity elements present in the material.

A SWCNT wafer is examined after the heat treatment by energy dispersive x-ray spectroscopy (EDS) (Noran System 6, Thermo Fisher Scientific, Waltham, Mass.). As seen in FIG. 5, besides carbon, the major elements present are iron (Fe), and silicon (Si), with some oxygen, and traces of sodium, magnesium, phosphorus, and chlorine. The material is then analyzed by Inductively Coupled Plasma Mass Spectrometry (ICP-MS) for Fe and Si (NSL Analytical Services Inc., Cleveland, Ohio). The Fe and Si contents in the SWCNT material are 6.3% and 4.8%, respectively (Table 1).

A sample of the as-received SWCNT is also analyzed by ICP-MS for Fe and Si content. The Fe content is about 1.54%, and the Si content is about 0.32% (Table 1). The increase in the percentages of these impurities from before to after the heat treatment is due to the removal of substantial amount of carbon (as amorphous carbon) from the material. The successful removal of amorphous carbon is also indicated by the increase in Raman G/D ratio from 5 in the as-received material to 22 in the heat-treated material.

Example 5—Purification of SWCNT Wafers by Solution Treatment

SWCNT wafers prepared as described in Ex. 3, and purified by heat treatment as described in Ex. 4, are further purified by immersing them in treatment solution "AAA-1" prepared as described in Ex. 1. Each wafer is placed in a separate glass dish having diameter of 9 cm, and then 30 ml of solution AAA-1 are added to the dish. The wafers are immediately wetted by the AAA-1 solution and submerge in the solution. The dishes are visually checked to ensure that the wafers are fully covered by the solution. The wafers are allowed to soak in the solution for 16 hrs. Then, the solution is discarded and the wafers are rinsed three times with a solution of 50% (w/w) reagent alcohol in de-ionized water, to remove the acid and dissolved residue. The wafers are then dried in a standard laboratory oven for 3 hrs. at 200° C.

Figure 6:
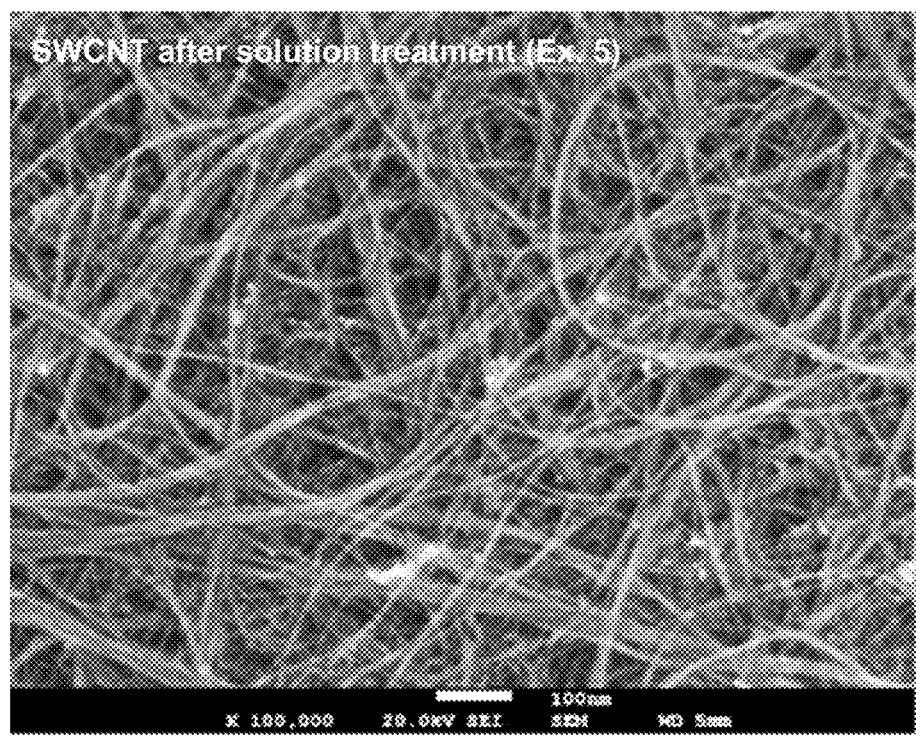
FIG. 6 shows a SEM image of a CNT material after solution treatment to remove inorganic impurities, as described in Ex. 5.

A wafer is examined by SEM after treatment with AAA-1 solution. As seen in FIG. 6, most of the small white particles or clusters that are observed within the material after heat treatment (FIG. 4) are now removed. A few white particles or clusters are still visible.

A sample of SWCNT wafer material, after treating with AAA-1 solution, is analyzed by ICP-MS for Fe and Si. The Fe content is about 1.1%, and the Si content is about 4.1% (Table 1). Treating the SWCNT wafer with AAA-1 solution substantially reduces the amount of Fe impurity, and partially reduces the amount of Si impurity in the material, compared to the material that was only heat treated to remove amorphous carbon (Ex. 4).

Example 6—Purification of SWCNT Wafers by Solution Treatment

SWCNT wafers prepared as described in Ex. 3, and heat treated as described in Ex. 4 are further purified by immersing them in treatment solution "AAA-2" prepared as described in Ex. 2. Each wafer is placed in a separate plastic dish, and then 40 ml of solution AAA-2 are added to the dish. The wafers are immediately wetted by the AAA-2 solution and submerge in the solution. The dishes are visually checked to ensure that the wafers are fully covered by the solution. The wafers are allowed to soak in the solution for 16 hrs. Then, the solution is discarded and the wafers are rinsed three times with a solution of 50% (w/w) reagent alcohol in de-ionized water, to remove the acid and dissolved residue. The wafers are then dried in a standard laboratory oven for 3 hrs at 200° C.

Figure 7:
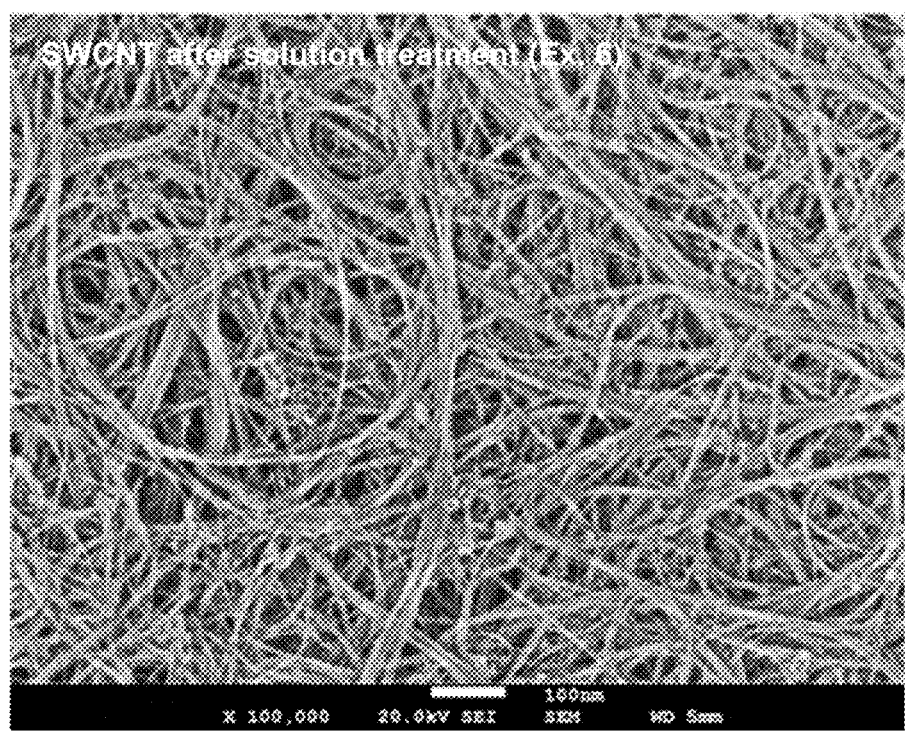
FIG. 7 shows a SEM image of a CNT material after solution treatment to remove inorganic impurities, as described in Ex. 6.

A wafer is examined by SEM after treatment with AAA-2 solution. As seen in FIG. 7, essentially all of the small white particles or clusters that are observed within the material after heat treatment (FIG. 4) are now removed. Only one or two white-colored features are visible, that might be residue particles.

A sample of AAA-2 solution-treated wafer material is analyzed by ICP-MS for the elements iron (Fe) and silicon (Si). The Fe content in the heat-treated and AAA-2 solution-treated SWCNT material is about 0.22% (~2200 ppm). The Si content in the material is about 0.16% (~1600 ppm). Treatment of the SWCNT in AAA-2 solution substantially reduces the amount of both Fe and Si impurities in the material, compared to treatment in AAA-1 solution. This is due to the presence of hydrofluoric acid in the AAA-2 treatment solution.

Furthermore, the AAA-2 solution treatment imparted little or no damage to the purified CNT material, as shown by the Raman G/D ratio of 18, which is only slightly lower compared to the same material prior to the treatment in AAA-2 solution (Ex. 4, G/D ratio of 22).

Comparative Example 1—CNT Purification by Solution Treatment Followed by Heat Treatment (Reverse Sequence of Example 6)

SWCNT wafers prepared as described in Ex. 3 are solution treated by immersing them in treatment solution "AAA-2", prepared as described in Ex. 2. The solution treatment, rinsing, and drying are performed in the same manner as described in Ex. 6. Following the solution treatment with AAA-2 solution, the SWCNT wafers are heat treated in an atmosphere comprising oxygen, in the same manner as described in Ex. 4. This sequence of purification treatments is the reverse of the sequence described in Ex. 6.

A wafer is examined after the treatments by SEM. The material closely resembles the material prepared as described in Ex. 4, and shown in FIG. 4. That is, amorphous carbon is substantially absent from the material, but inorganic impurities are visible as numerous particles on the order of 1-100 s of nm in size. A sample is analyzed by ICP-MS and it is determined to contain about 6% Fe and about 5% Si, also similar to the results for the material prepared as described in Ex. 4 (Table 1).

In this comparative example, the solution treatment performed prior to the heat treatment in oxygen is ineffective at removing inorganic impurities. This is due to the carbonaceous impurities, which have not as yet been removed, surrounding, shielding, and/or encapsulating the inorganic impurity particles, thereby preventing the treatment solution from having the desired effect.

Example 7—Treatment of Heat-Treated SWCNT in Chlorine and Hydrogen Atmospheres

SWCNT wafers prepared as described in Ex. 3 and heat treated as described in Ex. 4, are further purified of inorganic residue by treating in atmospheres of chlorine gas, followed by hydrogen gas, at elevated temperature. The wafers are not treated with either solution AAA-1 or AAA-2.

The SWCNT wafers are first placed inside a Mellen quartz tube furnace on two sets of perforated quartz plates arranged in two horizontal levels. The wafers are arranged such that they are evenly distributed within the hot zone of the furnace. The furnace is sealed and then purged with nitrogen flowing at a rate of 2 liter/min for at least 3 hrs. The purge gas is then switched to argon at a flow rate of 1.5 liter/min and purged for a further 2 hrs.

Continuing the flow of argon, the furnace is heated from room temperature to 200° C. at a rate of 300° C./hr and held at 200° C. for 2 hr. Then, the furnace is heated from 200° C. to 1050° C. at a heating rate of 300° C./hr. When the furnace reaches 1050° C., the gas supply to the furnace is changed from argon to a mixture of 10% (v/v) chlorine ($Cl_2$) in argon, at a flow rate of 1.7 liter/min. The furnace is held at 1050° C. for 2 hr while supplying the $Cl_2$/Ar mixture.

The flow of chlorine is stopped and the gas supply is changed back to pure argon at 1.5 liter/min. The furnace is held at 1050° C. for 2 hrs while purging with argon to remove any remaining chlorine. Then, the gas supply is changed to a mixture of 5% (v/v) hydrogen ($H_2$) in argon, at a flow rate of 1.5 liter/min. The furnace is held for 2 hr at 1050° C. while supplying the $H_2$/Ar mixture. The furnace is then cooled to room temperature, initially at a rate of −600° C./hr, until the rate is reduced by natural cooling. After furnace cooling starts, the gas is changed back to pure argon flowing at a rate of 1.5 liter/min. When the furnace temperature drops below 550° C., the gas supply is changed to 2 liter/min nitrogen until the furnace is below 50° C., at which point the nitrogen supply is turned off and the SWCNT samples are removed from the furnace.

Figure 8:
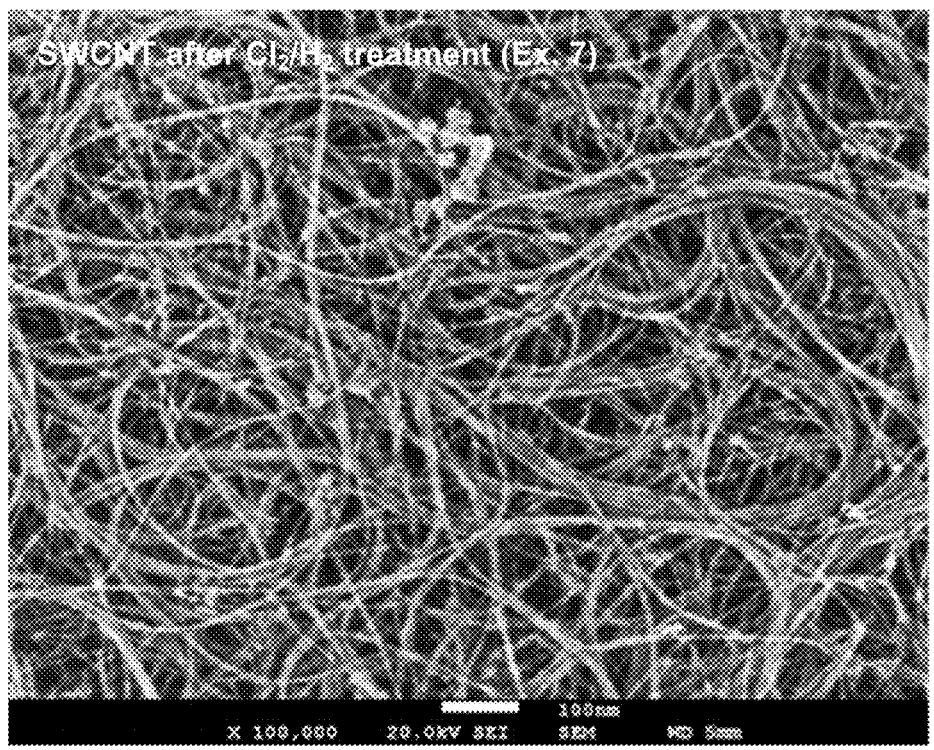
FIG. 8 shows a SEM image of a CNT material after treatment in chlorine and hydrogen atmospheres, as described in Ex. 7.

After the $Cl_2$/$H_2$ treatment, a SWCNT wafer is examined by SEM. As seen in FIG. 8, the material is largely free of impurity residue, but some white particles and clusters are visible. The material appears qualitatively similar to the materials prepared as described in Ex. 5 and Ex. 6.

A sample of this material is analyzed by ICP-MS for Fe and Si content. The Fe content is about 0.028% (~280 ppm) and the Si content is about 0.10% (1000 ppm) (Table 1). The combination of heat treatment under oxygen, followed by high-temperature heat treatment under chlorine followed by hydrogen, results in a material having a high level of purity with regard to both amorphous carbon and inorganic residue. Inorganic impurity residue in the CNT material of about 0.1 wt % (1000 ppm) is achieved after applying this purification process.

Example 8—Further Purification of Heat-Treated and Solution-Treated SWCNT in Chlorine and Hydrogen Atmospheres SWCNT wafers prepared as described in Ex. 3, heat treated as described in Ex. 4, and solution-treated as described in Ex. 6, are further purified of inorganic residue by treating at elevated temperature in atmospheres of chlorine gas, followed by hydrogen gas, as described in Ex. 7.

Figure 9:
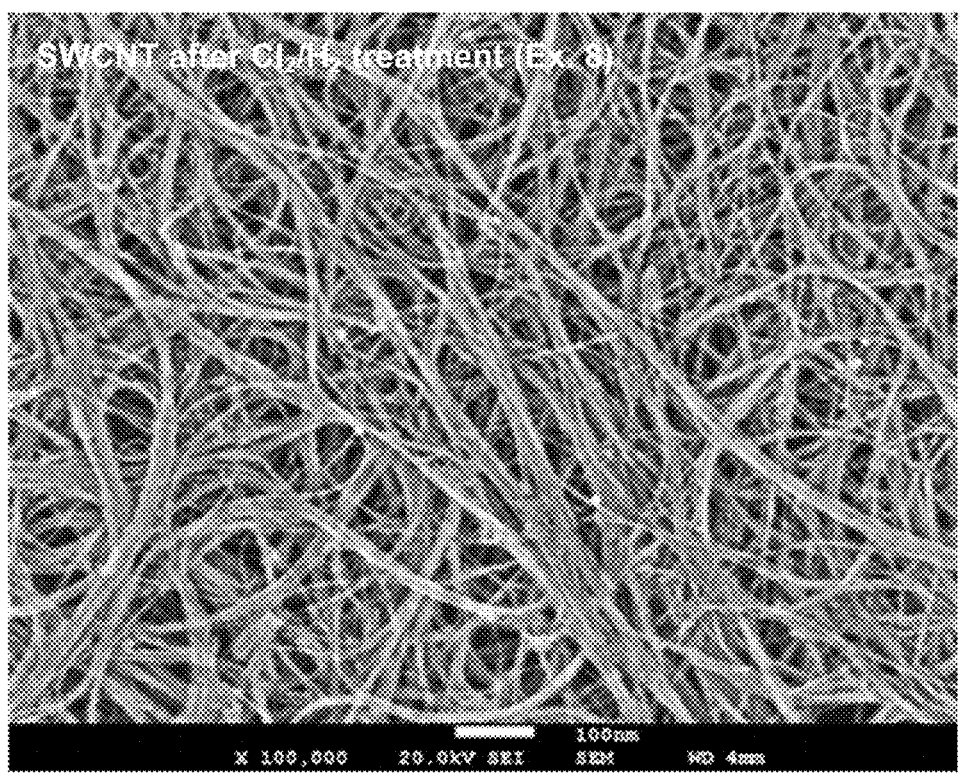
FIG. 9 shows a SEM image of a CNT material after treatment in chlorine and hydrogen atmospheres, as described in Ex. 8.

A SWCNT wafer is examined by SEM after the $Cl_2$/$H_2$ treatment at 1050° C. As seen in FIG. 9, the material consists almost entirely of carbon nanotubes and nanotube bundles. The material's appearance is similar to that of the material prior to $Cl_2$/$H_2$ treatment (FIG. 7), with possibly even fewer visible particles or clusters.

A sample of $Cl_2$/$H_2$ treated SWCNT wafer is analyzed by ICP-MS for Fe and Si content. The Fe content is about 0.013% (~130 ppm), and the Si content is about 0.032% (~320 ppm) (Table 1). The ICP-MS results demonstrate that the combination of solution treatment followed by $Cl_2$/$H_2$ treatment provides the highest purity among all procedures described herein, with regard to Fe and Si content in the material. Inorganic impurity residue in the CNT material of less than 0.05% (500 ppm) is achieved after applying this purification process.

Furthermore, treatment in chlorine and hydrogen gases for additional removal of inorganic residue did not impart damage to the purified CNT, as indicated by the Raman G/D ratio of 18, the same ratio found in the material prior to the $Cl_2/H_2$ treatment (Ex. 6).

Comparative Example 2—CNT Purification by Chlorine Treatment, Oxygen Heat Treatment, and Solution Treatment SWCNT wafers prepared as described in Ex. 3, are first treated in an atmosphere comprising chlorine, then treated in an atmosphere comprising hydrogen, in the same manner as described in Ex. 7. Following that, the wafers are heat treated in an atmosphere comprising oxygen, in the same manner as described in Ex. 4, and then solution treated in the same manner as described in Ex. 6 using AAA-2 treatment solution. In this procedure, the same treatment steps are applied as described in Ex. 8, except the chlorine and hydrogen treatments are applied prior to the oxygen heat treatment and solution treatment.

A wafer is examined after the treatments by SEM. The material closely resembles the material prepared as described in Ex. 6, shown in FIG. 7. Essentially all amorphous carbon is removed from the material, and only a few clusters or particles of inorganic impurity residue are visible. A sample of the material is analyzed by ICP-MS, and is determined to contain about 0.2% Fe and about 0.1% Si, also comparable to the results for the material prepared as described in Ex. 6.

In this comparative example, the chlorine treatment applied prior to the oxygen heat treatment and solution treatment, is only partially effective in removing inorganic impurities. As in Comparative Example 1, this is due to the carbonaceous impurities, which have not as yet been removed, surrounding, shielding, and/or encapsulating inorganic impurity particles, thereby preventing the treatment solution from having the desired effect. In particular, removal of residual catalyst materials such as iron by reaction with chlorine gas is hampered by the presence of carbonaceous impurities.

TABLE 1

Fe and Si content of SWCNT materials purified by various methods.

| Example | Treatment Method | Fe (%), ICP-MS | Si (%), ICP-MS | Raman G/D |
|---|---|---|---|---|
| As-rec'd (4) | None | 1.54 | 0.32 | 5 |
| 4 | Heat treatment w/$O_2$ | 6.3 | 4.8 | 22 |
| 5 | Ex. 4 + AAA-1 solution treatment | 1.1 | 4.1 | — |
| 6 | Ex. 4 + AAA-2 solution treatment | 0.22 | 0.16 | 18 |
| 7 | Ex. 4 + $Cl_2/H_2$ treatment | 0.028 | 0.10 | — |
| 8 | Ex. 6 + $Cl_2/H_2$ treatment | 0.013 | 0.032 | 18 |
| Comp. 1 | AAA-2 solution treatment + Ex. 4 | ~6 | ~5 | — |
| Comp. 2 | $Cl_2/H_2$ treatment + Ex. 6 | ~0.2 | ~0.1 | — |

Example 9—Heat Treatments of SWCNT with Various Ratios of $O_2$ Supplied/C Consumed The purification heat treatment of SWCNT wafers, as described in Ex. 4, is repeated several times. For each individual heat treatment procedure, a different ratio of oxygen supplied to carbon consumed is employed. Over five discrete procedures, the ratio is varied from a minimum of 2.59 to a maximum of 3.86.

For each procedure, the total yield of SWCNT is determined by weighing all the wafers before they are loaded into the heat treating furnace, and then weighing them again after the procedure, and dividing the total final weight of the wafers by the total initial weight of the wafers. Over the five discrete procedures, the yield percent varies from a minimum of 16.1% to a maximum of 25.4%.

For each procedure, a sample of heat treated SWCNT wafer is analyzed by Raman spectroscopy (LabRAM ARAMIS, Horiba Jobin Yvon Inc.) and its G/D ratio determined. Over the five discrete procedures, the G/D ratio varies from a minimum of about 22, to a maximum of about 48.

Figure 10:
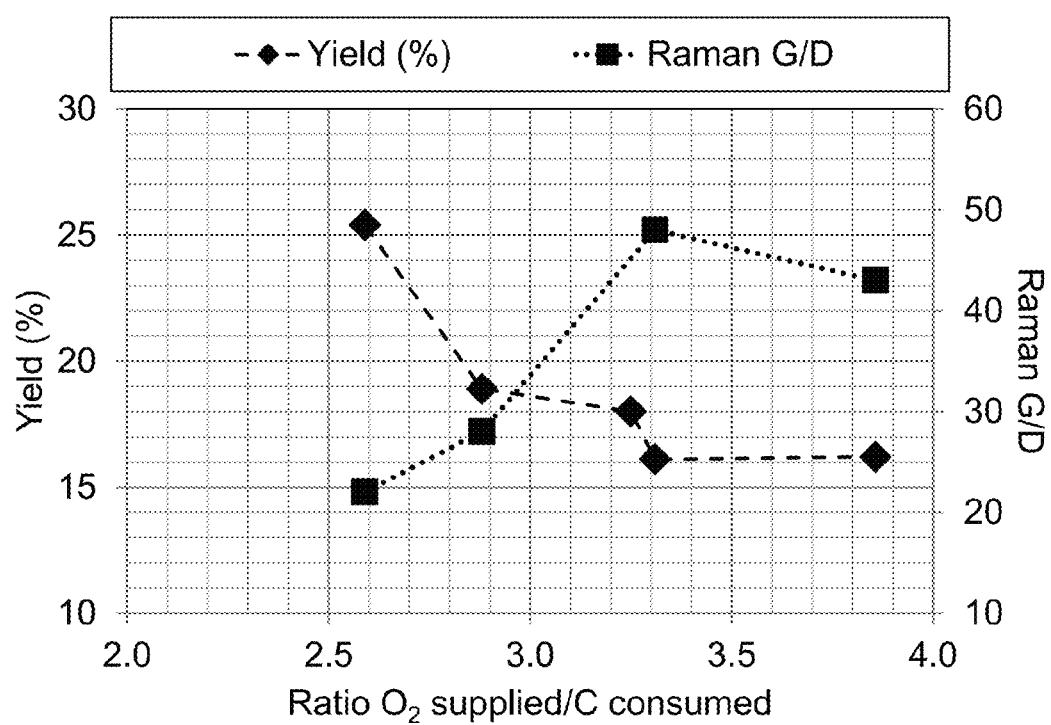
FIG. 10 shows a chart of Raman G/D ratio and percent yield of CNT material vs. the ratio of oxygen supplied to carbon consumed, in the heat treatment of CNT starting material to remove amorphous carbon, as described in Ex. 9.

Yield percentage of SWCNT, and Raman G/D ratio, are plotted as functions of the ratio of oxygen supplied/carbon consumed ($O_2$/C), as shown in FIG. 10. Clearly, as the $O_2$/C ratio is increased, Raman G/D ratio increases as well, while yield percentage of SWCNT decreases. These trends are due to more complete removal of amorphous carbon from the SWCNT wafer, and possibly due as well to some repair of defects in the SWCNT. At $O_2$/C ratio of about 3.5, the yield percentage and Raman G/D ratio appear to level off (at values of about 16% and 45-50, respectively). That is, further increasing the $O_2$/C ratio does not appear to have much effect on either yield or G/D ratio. This suggests that an optimum $O_2$/C ratio for removal of amorphous carbon from this SWCNT material might be about 3.5.

What is claimed is:

1. A method for purifying carbon nanotubes, comprising the steps in the order of:
   (a) obtaining a carbon nanotube starting material that contains impurities;
   (b) removing amorphous carbon from the carbon nanotube starting material by heat treating the carbon nanotube starting material between 300 and 550° C. for 20 to 80 hours in the presence of a specified amount of oxygen and inert gas in a heating chamber with less than 1 ppm of water vapor and other reactive species in the heating chamber;
   (c) removing inorganic impurities from the carbon nanotube starting material by treating it with a treatment solution comprising water, 1N to 5N HCl, and 0.1N to 0.5N HF.

2. The method of claim 1, wherein in step (b), the molar ratio of the amount of oxygen provided during the heat treating to the amount of carbon removed is between 1 and 8.

3. The method of claim 1, wherein in step (c) the treatment solution further comprises an organic solvent.

4. The method of claim 3, wherein in step (a), the carbon nanotube starting material is in a form of a wafer, film, or buckypaper having a thickness less than 50 micrometers.

5. The method of claim 3, wherein the organic solvent is an alcohol selected from the group consisting of methanol, ethanol, propanol, or any combination thereof.

6. The method of claim 1, wherein after step (c), the carbon nanotube starting material is further purified of inorganic impurities by treating it in an atmosphere comprising chlorine ($Cl_2$).

7. The method of claim 6, wherein in step (c) the treatment solution further comprises an organic solvent.

8. The method of claim 7, wherein the organic solvent is an alcohol selected from the group consisting of methanol, ethanol, propanol, or any combination thereof.

9. The method of claim 6, wherein the treating in the atmosphere comprising chlorine is conducted at a temperature between 600° C. and 1200° C.

10. The method of claim 6, wherein after treating in the atmosphere comprising chlorine ($Cl_2$), the carbon nanotube starting material is further treated in an atmosphere comprising hydrogen ($H_2$).

11. The method of claim 10, wherein the treating in the atmosphere comprising hydrogen is conducted at a temperature between 600° C. and 1200° C.

12. The method of claim 1, wherein step (b) is performed prior to any step for removing the inorganic impurities.

13. The method of claim 1, wherein the specific amount of oxygen is between 1 ppm and 200,000 ppm in the heating chamber.

14. The method of claim 1, wherein in step (b), the carbon nanotube is heated treated between 300-400° C.

15. The method of claim 1, wherein in step (b), the carbon nanotube is heated treated between 400-500° C.

16. The method of claim 1, wherein in step (b), the carbon nanotube is heated treated between 450-550° C.

\* \* \* \* \*